(12) United States Patent
Sakatani et al.

(10) Patent No.: US 7,521,391 B2
(45) Date of Patent: Apr. 21, 2009

(54) COATING COMPOSITION OF PHOTOCATALYST

(75) Inventors: Yoshiaki Sakatani, Paris (FR); Seiichi Sakaguchi, Yamatotakada (JP)

(73) Assignees: Sumitomo Chemical Company, Limited, Tokyo (JP); Asahi Chemical Company, Limited, Osaka (JP)

( * ) Notice: Subject to any disclaimer, the term of this patent is extended or adjusted under 35 U.S.C. 154(b) by 80 days.

(21) Appl. No.: 11/080,544

(22) Filed: Mar. 16, 2005

(65) Prior Publication Data

US 2005/0233893 A1 Oct. 20, 2005

(30) Foreign Application Priority Data

Mar. 17, 2004 (JP) .......................... P2004-075810
May 10, 2004 (JP) .......................... P2004-139514
Oct. 8, 2004 (JP) .......................... P2004-295798

(51) Int. Cl.
*B01J 21/00* (2006.01)
*B01J 23/00* (2006.01)
*B01J 20/00* (2006.01)

(52) U.S. Cl. .................. 502/239; 502/242; 502/349; 502/350; 502/407

(58) Field of Classification Search ............... 502/239, 502/242, 349, 350, 407
See application file for complete search history.

(56) References Cited

U.S. PATENT DOCUMENTS

| | | | | |
|---|---|---|---|---|
| 4,016,129 A | * | 4/1977 | Miyosawa .............. | 524/557 |
| 4,631,267 A | * | 12/1986 | Lachman et al. ........ | 502/439 |
| 5,030,601 A | * | 7/1991 | Michel et al. .......... | 501/103 |
| 5,032,556 A | * | 7/1991 | Mori et al. ............ | 501/106 |
| 5,104,832 A | * | 4/1992 | Michel et al. .......... | 501/103 |
| 5,120,811 A | * | 6/1992 | Glotfelter et al. ...... | 528/25 |
| 5,228,480 A | * | 7/1993 | Tamura ................ | 139/1 E |
| 5,728,636 A | * | 3/1998 | Nawa et al. ........... | 501/105 |
| 5,863,850 A | * | 1/1999 | Nawa et al. ........... | 501/105 |
| 5,981,425 A | * | 11/1999 | Taoda et al. ........... | 502/208 |
| 6,103,363 A | | 8/2000 | Boire et al. | |
| 6,326,079 B1 | | 12/2001 | Philippe et al. | |
| 6,337,301 B1 | | 1/2002 | Ohmori et al. | |
| 6,391,276 B1 | * | 5/2002 | Suda et al. ............ | 423/598 |
| 6,407,033 B1 | * | 6/2002 | Kimura et al. ......... | 502/350 |
| 2001/0024685 A1 | * | 9/2001 | Boulton et al. ........ | 427/162 |
| 2002/0160910 A1 | | 10/2002 | Sanbayashi et al. | |
| 2002/0169076 A1 | | 11/2002 | Takeshi et al. | |
| 2003/0124467 A1 | | 7/2003 | Minami et al. | |
| 2004/0028819 A1 | * | 2/2004 | Park et al. ............ | 427/372.2 |
| 2005/0090634 A1 | * | 4/2005 | Morse et al. .......... | 528/12 |

FOREIGN PATENT DOCUMENTS

| | | |
|---|---|---|
| EP | 0 866 101 A1 | 9/1998 |
| EP | 1 065 169 A1 | 1/2001 |
| EP | 1 095 908 A1 | 5/2001 |
| EP | 1 125 636 A1 | 8/2001 |
| EP | 1 132 351 A1 | 9/2001 |
| EP | 1 138 634 A1 | 10/2001 |
| EP | 1 160 202 A1 | 12/2001 |
| EP | 1 174 392 A1 | 1/2002 |
| EP | 1 178 011 A1 | 2/2002 |
| EP | 1 219 569 A2 | 7/2002 |
| JP | 09-328336 A | 12/1997 |
| JP | 11-209694 A | 8/1999 |
| JP | 2001-72419 A | 3/2001 |
| JP | 2001-190953 A | 7/2001 |
| JP | 2001-212457 A | 8/2001 |
| JP | 2001-278625 A | 10/2001 |
| JP | 2001-278626 A | 10/2001 |
| JP | 2001-278627 A | 10/2001 |
| JP | 2001-302241 A | 10/2001 |
| JP | 2001-316116 A | 11/2001 |
| JP | 2001-322816 A | 11/2001 |
| JP | 2001-335321 A | 12/2001 |
| JP | 2001-354422 A | 12/2001 |
| JP | 2002-029749 A | 1/2002 |
| JP | 2002-029750 A | 1/2002 |
| JP | 2002-47012 A | 2/2002 |
| JP | 2002-060221 A | 2/2002 |
| JP | 2002-97019 A | 4/2002 |
| JP | 2002-193618 A | 7/2002 |
| JP | 2002-239395 A | 8/2002 |
| JP | 2002-249319 A | 9/2002 |
| JP | 2003-105262 A | 4/2003 |
| JP | 2004-059686 A | 2/2004 |
| WO | WO 98/15600 A1 | 4/1998 |
| WO | WO 01/10552 A1 | 2/2001 |
| WO | WO 01/23483 A1 | 4/2001 |
| WO | WO 02/053501 A1 | 7/2002 |
| WO | WO 03/033144 A1 | 4/2003 |
| WO | WO 03/080244 A1 | 10/2003 |
| WO | WO 03/101904 A1 | 12/2003 |

OTHER PUBLICATIONS

K. Nukumizu et al., "$TiN_xO_yF_z$ as a Stable Photocatalyst for Water Oxidation in Visible Light (<570 nm)", *Chemistry Letters*, vol. 32, No. 2, 2003, pp. 196-197.

(Continued)

*Primary Examiner*—Cam N. Nguyen
(74) *Attorney, Agent, or Firm*—Sughrue Mion, PLLC

(57) ABSTRACT

A photocatalytic coating composition comprising a photocatalyst, a silicon alkoxide, a zirconium compound, colloidal silica, and a liquid medium, wherein a content of the zirconium compound in terms of zirconium atoms is 0.3 to 3 times by mole a content of the silicon alkoxide in terms of silicon atoms, which can form a coating film of a photocatalyst with a high adhesion strength to a substrate.

6 Claims, No Drawings

OTHER PUBLICATIONS

T. Ohno et al., "Photocatalytic Activity of S-doped $TiO_2$ Photocatalyst under Visible Light", *Chemistry Letters*, vol. 32, No. 4, 2003, pp. 364-365.

H. Irie et al., "Carbon-doped Anatase $TiO_2$ Powders as a Visible-light Sensitive Photocatalyst", *Chemistry Letters*, vol. 32, No. 8, 2003, pp. 772-773.

S. Sakthivel et al., "Daylight Photocatalysis by Carbon-Modified Titanium Dioxide", *Angew. Chem. Int. Ed.*, International Edition, 42, 2003, pp. 4908-4911.

Patent Abstracts of Japan, vol. 2002, No. 5, May 3, 2002 (corresponds to JP 2002-012448 published Jan. 15, 2002).

Patent Abstracts of Japan, vol. 2003, No. 4, Apr. 2, 2003 (corresponds to JP 2002-363496 published Dec. 18, 2002).

* cited by examiner

COATING COMPOSITION OF PHOTOCATALYST

This application claims priority to Japanese Patent Application Nos. 2004-75810, 2004-139514 and 2004-295798, which are herein incorporated by reference in their entireties.

BACKGROUND OF THE INVENTION

1. Field of the Invention

The present invention relates to a coating composition of a photocatalyst.

2. Description of Background Art

A photocatalyst is a catalyst which exhibits a catalytic activity when it is irradiated with light, and it is often used in the form of a coating composition comprising the photocatalyst and a binder and coated on a substrate to form a coating film containing the photocatalyst (see WO 98/15600, JP-A-2003-105262, JP-A-9-328336, JP-A-2004-59686, WO01/023483 and JP-A-11-209691).

However, a coating film formed from a conventional coating composition of a photocatalyst may not always have sufficient adhesion strength to a substrate. Therefore, an amount of a binder in relation to an amount of the photocatalyst should be increased. When the amount of the binder is increased, the photocatalyst may not sufficiently exhibit its activity.

SUMMARY OF THE INVENTION

An object of the present invention is to provide a photocatalytic coating composition comprising a photocatalyst, which can form a coating film having a sufficient adhesion force to a substrate even when a binder is used in a small amount.

Accordingly, the present invention provides a photocatalytic coating composition comprising a photocatalyst, a silicon alkoxide, a zirconium compound, colloidal silica, and a liquid medium, wherein a content of the zirconium compound in terms of zirconium atoms is 0.3 to 3 times by mole a content of the silicon alkoxide in terms of silicon atoms.

The photocatalytic coating composition of the present invention can form a coating film having a sufficient adhesion force to a substrate. Thus, the amount of the binder components can be decreased in relation to the amount of the photocatalyst, and the coating film formed from the photocatalytic coating composition of the present invention has a sufficient photocatalytic activity.

DETAILED DESCRIPTION OF THE INVENTION

A photocatalyst contained in the photocatalytic coating composition of the present invention is a material which exhibits photocatalytic activity when it is irradiated with UV ray or visible light. Specific examples of such a material include a powdery compound having a crystalline structure observed by X-ray diffraction analysis and comprising a metal element and at least one element selected from the group consisting of oxygen, nitrogen, sulfur and fluorine. Typical examples of such compounds include an oxide, a nitride, a sulfide, an oxynitride, an oxysulfide, a nitrofluoride, an oxyfluoride or an oxynitrofluoride of at least one metal element selected from the group consisting of Ti, Zr, Hf, V, Nb, Ta, Cr, Mo, W, Mn, Tc, Re, Fe, Co, Ni, Ru, Rh, Pd, Os, Ir, Pt, Cu, Ag, Au, Zn, Cd, Ga, In, Tl, Ge, Sn, Pb, Bi, La and Ce. Among them, the oxide of Ti, W or Nb is preferable. In particular, anatase titanium oxide, brukite titanium oxide and rutile titanium oxide are preferable.

The photocatalyst is used usually in an amount of at least 0.1% by weight, preferably at least 1% by weight, and no more than 30% by weight, based on the weight of the whole photocatalytic coating composition. In General, the photocatalyst forms secondary particles having an average particle size of 200 nm or less in the photocatalytic coating composition. The smaller average particle size of the secondary particles of the photocatalyst is more preferable, since the stability of the photocatalytic coating composition is increased and thus the sedimentation of the particles of the photocatalyst is prevented. Therefore, the average secondary particle size of the photocatalyst is preferably 150 nm or less, more preferably 100 nm or less.

Titanium oxide to be used as a photocatalyst may be produced by the sulfuric acid method or the chlorine method, which are well known in the art (see, for example, Manabu KIYONO "TITANIUM OXIDE" published in 1991 by GIHODO PUBLISHING Co., Ltd.). Alternatively, titanium oxide may be produced by reacting a titanium compound with a base, adding ammonium to the product, aging the mixture, separating the solid from the liquid, and sintering the solid.

Examples of the titanium compound used in this method include titanium trichloride ($TiCl_3$), titanium tetrachloride ($TiCl_4$), titanium sulfate, $(Ti(SO_4)_2 \cdot mH_2O$ in which m is a number of 0 to 20), titanium oxysulfate ($TiOSO_4 \cdot nH_2O$ in which n is a number of 0 to 20), titanium oxychloride ($TiOCl_2$), etc. Examples of the base to be reacted with the titanium compound include hydroxides of alkali metals (e.g. sodium hydroxide, potassium hydroxide, etc.), carbonates of alkali metals (e.g. sodium carbonate, potassium carbonate, etc.), ammonia, hydrazine, hydroxylamine, monoethanolamine, acyclic amine compounds (e.g. methylamine, dimethylamine, trimethylamine, ethylenediamine, etc.), and alicyclic amine compounds (e.g. pyrrolidone, piperidine, etc.).

The reaction of the titanium oxide with the base is carried out preferably at pH of at least 2, more preferably at least 3, and preferably 7 or less, more preferably 5 or less. The reaction temperature is preferably 90° C. or less, more preferably 70° C. or less, most preferably 55° C. or less.

To improve the milling property of titanium oxide produced, the reaction of the titanium compound with the base may be carried out in the presence of hydrogen peroxide.

The reaction mixture containing titanium oxide formed may be aged by maintaining the reaction mixture containing ammonia while stirring at a temperature of at least 0° C., preferably at least 10° C., and 110° C. or lower, preferably 80° C. or lower, more preferably 55° C. or lower, for a period of time of at least 1 minute, preferably at least 10 minutes and 10 hours or less, more preferably 2 hours or less.

The total content of ammonia used in the reaction and aging is preferably more than a stoichiometric amount of the base necessary for converting the titanium compound to titanium hydroxide in the presence of water, for example, 1.1 times by mole the titanium compound. As the amount of the base is increases, the photocatalytic coating composition which can form a film having a higher photocatalytic activity can be easily produced. Thus, the amount of the base is preferably at least 1.5 times by mole the titanium compound. However, if the base is used in an excessively large amount, any effect comparable to the amount of the base cannot be achieved. Therefore, the amount of the base is preferably not more than 20 times by mole, more preferably not more than 10 times by mole, the titanium compound.

The solid-liquid separation of the reaction mixture aged may be carried out by filtration under pressure, filtration under reduced pressure, centrifugation, decantation, etc. In the solid-liquid separation, the washing of the recovered solid product is preferably carried out.

The solid product recovered by the solid-liquid separation and the optional washing is calcined in an air-flow calcination furnace, a tunnel furnace, a rotational furnace, etc. at a temperature of at least 250° C., preferably at least 270° C., and 600° C. or less, preferably 500° C. or less, more preferably 400° C. or less. The calcination time depends on the calcination temperature and/or the calcination apparatus, and is usually at least 10 minutes, preferably at least 30 minutes, and 30 hour or less, preferably 5 hours or less.

The titanium oxide produced by calcination may be supported on a carrier such as a solid acidic compound such as an oxide or a hydroxide of tungsten, niobium, iron, nickel, etc.; a solid basic compound such as an oxide or a hydroxide of lanthanum, cerium, etc.; and a metal compound which absorbs visible light such as indium oxide, bismuth oxide, etc.

Tungsten oxide ($WO_3$) which can be used as a photocatalyst may be produced by calcining a tungsten compound such as ammonium metatungstate, etc. The calcination of the tungsten compound may be carried out under conditions such that the tungsten compound is converted to tungsten oxide, for example, in an air at a temperature of 250 to 600° C.

Niobium oxide ($Nb_2O_5$) which can be used as a photocatalyst may be produced by calcining a niobium compound such as niobium hydrogen succinate. Alternatively, niobium oxide may be produced by dissolving a niobium alkoxide such as niobium pentaethoxide, niobium pentaisopropoxide, etc., mixing the solution with an acidic solution comprising an inorganic acid and an alcohol, concentrating the mixture to obtain a viscous solution and calcining the viscous solution.

When an oxide other than titanium oxide, tungsten oxide and niobium oxide is used as a photocatalyst, it may be produced by reacting a chloride, a sulfate, an oxysulfate or an oxychloride of a metal constituting such an oxide and then calcining the reaction product in an air, or by calcining an ammonium salt of a metal constituting such an oxide in an air.

Besides the photocatalysts described above, the following photocatalysts may be used in the present invention:

(a) Titanium oxide having an index X of 0.97 or less and an index Y of at least 0.14, wherein the index X is represented by the formula:

X=B/A        (I)

in which A is an average value of half-value widths of a peak assigned to titanium in the first and second measurements, and B is an average value of half-value widths of a peak assigned to titanium in the third and fourth measurements, when the half-value width of a peak assigned to titanium in a binding energy rage of 458 eV to 460 eV of titanium oxide is measured four times by a X-ray photoelectron spectroscopy, and the index Y is represented by the formula:

Y=D/C        (II)

in which C and D are integration values of the absorbance of a spectrum in a wavelength range of 220 nm to 800 nm and that in a wavelength range of 400 nm to 800 nm, respectively, when a UV-visible light diffuse reflectance spectrum of titanium oxide is measured (see JP-A-2001-72419);

(b) Titanium oxide having at least 3 peaks in a g-value range of 1.930 to 2.030 in an electron spin resonance spectrum and the highest peak among those peaks being present in a g-value range of 1.990 and 2.020 (see JP-A-2001-190953);

(c) Titanium oxide having an electron spin density X of at least $1.50 \times 10^{16}$ spin/g, and a ratio of X/Y exceeds 1.00 wherein X is an electron spin density derived from an electron spin resonance spectrum measured after the irradiation of visible light, and Y is an electron spin density derived from an electron spin resonance spectrum measured before the irradiation of visible light (see JP-A-2001-316116);

(d) Titanium oxide having an index X1 of 0.9 or less and an index Y1 of at least 0.075, wherein the index X1 is represented by the formula:

X1=B1/A1        (II)

in which A1 and B1 are half-value widths of a peak present in a binding energy range of 458 eV to 460 eV found in the integrated spectra of the first and second analyses and the seventh and eighth analyses, respectively, of the electron states of titanium measured by a X-ray photoelectron spectroscopy eight times, and the index Y1 represented by the formula:

Y1=D1/C1 in which C1 and D1 are integration values of the absorbance of a spectrum in a wavelength range of 250 nm to 550 nm and that in a wavelength range of 400 nm to 550 nm, respectively, when a UV-visible light diffuse reflectance spectrum of titanium oxide is measured (see JP-A-2001-322816);

(e) Titanium oxide which has at least one peak of an integrated spectrum measured in the first and second analyses being present in a binding energy range of 459 eV to 460 eV, and at least one peak of an integrated spectrum measured in the seventh and eighth analyses being present in a binding energy range of 458 eV to 459 eV, when a UV-visible light diffuse reflectance spectrum of titanium oxide is measured eight times, and which has a transition metal content of 0.005 to 3.0% by mol in terms of a metal element based on the amount of titanium in titanium oxide (see JP A 2001 29719JP-A-2002-29749);

(f) Titanium oxide in which a desorption temperature peak of a component having a m/e of 28 is at least 600° C. wherein m is a mass and e is a charge number of ion obtained from a mass chromatogram measured by a simultaneous thermobalance-mass spectroscopy measurement, or titanium oxide in which a desorption temperature peak of a component having a m/e of 28 is in a range of 600° C. to 950° C., and a desorption temperature peak of a component having a m/e of 14 is in the range of 600° C. to 950° C., wherein m is a mass and e is a charge number of ion obtained from a mass chromatogram measured by a simultaneous thermobalance-mass spectroscopy measurement.

(g) Titanium oxide a part of oxygen sites of the titanium oxide crystal are replaced with nitrogen atoms, titanium oxide doped with nitrogen atoms in the lattice spaces of the titanium oxide crystal, and titanium oxide doped with nitrogen atoms at grain boundaries of the titanium oxide crystal (WO 01/10552);

(h) Titanium oxide having stable oxygen deficiencies in which a signal having a g-value of 2.003 to 2.004 is observed in an electron spin resonance spectrum measured in vacuum at 77K in darkness, and the signal intensity of the signal having a g-value of 2.003 to 2.004 is larger than that measured in vacuum at 77K with irradiating light having a wavelength of 420 nm to 600 nm (see JP-A-2001-212457);

(i) Spindle-shaped titanium oxide having, on its particle surfaces, a halogenated platinum compound such as $PtCl_2$, $PtCl_4$, $PtCl_2 \cdot 2H_2O$, $H_2[Pt(OH)_2Cl_4] \cdot nH_2O$, $PtBr_2$, $PtBr_4$, PtI₂, PtI₄, PtF₄, chloroplatinic acid, chloroplatinate, bromoplatinate, iodoplatinate, etc. (see JP-A-2002-239395);

(j) Titanium oxide having, on its particle surfaces, a metal halide (e.g. TiCl₄, etc.) or a metal complex (e.g. heteropoly acid, isopoly acid, etc.) (see WO 03/080244);

(k) Titanium oxide having, on its particle surfaces, an alkaline earth metal, a transition metal and aluminum (see WO 02/053501);

(l) Titanium oxide in which a part of oxygen atoms are replaced with nitrogen and fluorine atoms (see Chemistry Letters, Vol. 32, No. 2 (2003) 196-197);

(m) Titanium oxide in which a part of titanium atoms are replaced with sulfur atoms (Chemistry Letters, Vol. 32, No. 4 (2003) 364-365);

(n) Titanium oxide doped with carbon atoms (see Chemistry Letters, Vol. 32, No. 8 (2003) 772-773 and Angewandte Chemie, International Edition, 42 (2003) 4908-4911).

In addition, titanium oxide prepared by any one of the methods described in JP-A-2001-278625, JP-A-2001-278626, JP-A-2001-278627, JP-A-2001-302241, JP-A-2001-335321, JP-A-2001-354422, JP-A-2002-29750, JP-A-2002-47012, JP-A-2002-60221, JP-A-2002-193618, JP-A-2002-249319, etc. may be used.

The above titanium oxides may be used independently or in admixture of two or more of them.

The photocatalytic coating composition of the present invention contains a silicon alkoxide, a zirconium compound, and colloidal silica.

Examples of the silicon alkoxide include a silicon alkoxide represented by the formula:

Si(OR)₄, RSi(OR)₃ or R₃Si(OR)

wherein R is an alkyl group having 1 to 6 carbon atoms, and their oligomers such as dimer, trimer, tetramer, pentamer, hexamer, etc.

Examples of the zirconium compound include zirconium salts (e.g. ZrCl₄, ZrOCl₂, Zr(NO₃)₄, ZrO(NO₃)₂, Zr(CH₃COO)₄, Zr(SO₄)₂, ZrOSO₄, etc.), zirconium alkoxides (e.g. zirconium ethoxide, zirconium propoxide, zirconium butoxide, etc.), partial hydrolysates of the zirconium alkoxides, and so on. Among them, chlorine-containing salts such as ZrCl₄, ZrOCl₂, etc., zirconium nitrates such as Zr(NO₃)₄, ZrO(NO₃)₂, etc. and zirconium butoxide and its partial hydrolysate are preferable.

The colloidal silica preferably has an average particle size of 50 nm or less, more preferably 30 nm or less.

The content of the zirconium compound in terms of zirconium atoms in the photocatalytic coating composition of the present invention is from 0.3 to 3 times by mole, preferably 0.4 to 1.5 times by mole, more preferably 0.8 to 1.5 times by mole, the content of the silicon alkoxide in terms of silicon atoms.

When the content of the zirconium compound is less than 3 times by mole the content of the silicon compound, the photocatalytic coating composition tends to be gelled during storage, and a coating film having a sufficient adhesion force to the substrate may not be formed.

The content of the colloidal silica in terms of an oxide is preferably 1 to 200 parts by weight, more preferably 10 to 150 parts by weight based on 100 parts by weight of the silicon alkoxide in terms of an oxide. When the content of the colloidal silica is less than 1 part by weight, the coating film formed may have a decreased catalytic activity.

The total content of the silicon alkoxide, zirconium compound and colloidal silica in the photocatalytic coating composition of the present invention is preferably from 5 to 200 parts by weight based on 100 parts by weight of the photocatalyst. The total content of the silicon alkoxide, zirconium compound and colloidal silica may be smaller than 70 parts by weight, or 40 parts by weight, since the photocatalytic coating composition of the present invention can form a coating film having a sufficient adhesion force even when the amounts of the silicon alkoxide, zirconium compound and colloidal silica are small. When the total content of the silicon alkoxide, zirconium compound and colloidal silica exceeds 200 parts by weight, the photocatalyst is buried in the binder components so that any coating film having a sufficient catalytic activity may hardly be formed.

The photocatalytic coating composition of the photocatalyst according to the present invention comprises water as a medium. The content of water is preferably at least a stoichiometric amount for hydrolyzing the silicon alkoxide and the zirconium compound.

The photocatalytic coating composition of the present invention may be formulated by diluting the above components with a liquid medium. As a liquid medium, water may be used alone, while an organic solvent is usually used. Examples of the organic solvent include alcohols such as methanol, ethanol, n-propanol, isopropanol, n-butanol, isobutanol, tert-butanol, etc.

The photocatalytic coating composition of the present invention is diluted with the liquid medium such that a solid content of the composition after evaporating volatile components is usually 0.5 to 50% by weight, preferably 1 to 30% by weight, more preferably 2 to 15% by weight. When the solid content is less than 0.5% by weight, the coating film having a sufficient thickness may hardly be formed. When the solid content exceeds 50% by weight, the coating film formed tends to lose transparency.

The photocatalytic coating composition of the present invention may be prepared by mixing a dispersion of the photocatalyst in a solvent with a binder liquid comprising the silicon alkoxide, zirconium compound and colloidal silica and also a solvent. Alternatively, the silicon alkoxide, zirconium compound and colloidal silica are successively added to the dispersion of the photocatalyst, or the binder components may be added when the dispersion of the photocatalyst is prepared.

The dispersion of the photocatalyst may be prepared by a conventional method, for example, by deflocculating the photocatalyst in an acid such as nitric acid, by dispersing the photocatalyst with a wet mill, by dispersing the photocatalyst using the change of a pressure generated when the pressure of the mixture is quickly reduced or when cavities, which are formed in a liquid by agitating the liquid with agitation blades rotated at a high speed, collapse, by dispersing the photocatalyst by a shear force generated by the rotation of agitation blades, screws, etc. One of these methods may be independently carried out, or two or more methods may be carried out in combination. The dispersion of the photocatalyst is preferably carried out under conditions such that the main component of the photocatalyst, which has the crystal structure obtained from the X-ray diffraction spectrum, is reserved. Preferably, the photocatalyst is dispersed at a temperature of less than 90° C. From the viewpoint of the reservation of the main component of the photocatalyst having such a crystal structure, the photocatalyst is preferably dispersed at a relatively low temperature, for example, 80° C. or less, preferably 75° C. or less. When the dispersing temperature is too low, the stability of the coating composition may be decreased. Thus, the dispersing temperature is preferably at least 10° C., more preferably at least 20° C. The dispersing time depends on the dispersing temperature, a kind of an apparatus used, etc. and is usually at least 1 minute, preferably at least 1 hour, and it does not exceed preferably 50 hours, more preferably 24 hours. The dispersing of the photocatalyst may be carried out two or more times.

After dispersing, the photocatalytic coating composition may be centrifuged to remove coarse particles, or diluted to adjust the content of the photocatalyst. When the coating composition is prepared using a dispersant in a larger amount than a desired content of the dispersant in the final coating composition, the dispersant is partly removed to adjust the content of the dispersant to a desired level. The dispersant may be removed by any known method such as light irradiation, heating, addition of an oxidizing or reducing agent, treatment with an ion-exchange membrane, ozone treatment, hydrothermal treatment, etc. The pH of the mixture obtained by dispersing the photocatalyst may optionally be adjusted by adding an acid or a base. Examples of the acid used include hydrochloric acid, nitric acid, phosphoric acid, sulfuric acid, etc., and examples of the base used include ammonia, urea, hydrazine, alkali metal hydroxides (e.g. lithium hydroxide, sodium hydroxide, potassium hydroxide, rubidium hydroxide and cesium hydroxide), etc.

As colloidal silica, silica sol containing 20 to 40% by weight of silica dispersed in a solvent is preferably used from the viewpoint of the stability of the photocatalytic coating composition. The solvent is preferably an alcohol such as methanol, isopropanol, etc. In particular, silica sol comprising isopropanol and having a solid content of 30% by weight is preferably used.

The photocatalytic coating composition of the present invention preferably contains a chelating agent, since the hydrolysis of the zirconium compound is prevented, so that the clouding and gellation of the coating composition can be suppressed, the haze of the coating film formed can be decreased and the hardness of the coating film can be increased.

Specific examples of the chelating agent, which can form a chelate compound with zirconium atoms, include β-diketones (e.g. acetylacetone, benzoylacetone, etc.), α- or β-ketonic acids (e.g. acetoacetic acid, propionylbutyric acid, benzoylacetic acid, pyruvic acid, benzoylformic acid, etc.) and methyl, ethyl, n-propyl, isopropyl, n-butyl or tert-butyl esters of α- or β-ketonic acids, methyl, ethyl, n-propyl, isopropyl, n-butyl or tert-butyl esters of α- or β-oxyacids (e.g. glycolic acid, lactic acid, α-oxybutyric acid, hydracrylic acid, salicylicacid, etc.), α- or β-oxyketones (e.g. diacetone alcohol, acetoin, etc.), α- or β-oxyaldehydes (e.g. glycolaldehyde, aldol, etc.), α-aminoacids (e.g. glycin, alanine, etc.), α- or β-aminoalcohols (e.g. aminoethyl alcohol, etc.), dicarboxylic acids (e.g. oxalic acid, glutaric acid, succinic acid, malonic acid, maleicacid, adipicacid, etc.), tricarboxylicacids (e.g. citric acid, etc.), and so on. These chelating agents may be used independently or in admixture of two or more of them. Among them, acetylacetone and ethyl acetoacetate are preferable.

When a chelating agent is used, the amount of the chelating agent is usually 1 to 40 times by mole, preferably 1.5 to 20 times by mole, more preferably 2 to 10 times by mole, the content of the zirconium compound in terms of zirconium atoms. When the content of the chelating agent is less than 1 (one) time by mole, the photocatalytic coating composition may not effectively be stabilized. When the content of the chelating agent exceeds 40 times by mole, the effects of the chelating agent may not increase at a level commensurate with the increased amount of the chelating agent, and such a large amount of the chelating agent is unfavorable in view of costs.

When the chelating agent is used, a photocatalytic coating composition comprising an alcohol as a solvent is preferably used. Preferably, the zirconium compound, a part of the alcohol and the chelating agent are mixed and maintained, and then the mixture is further mixed with the silicon alkoxide, colloidal silica and the photocatalyst.

The photocatalytic coating composition of the present invention may optionally contain an inorganic compound besides the photocatalyst. Specific examples of the inorganic compound include aluminum oxide or hydroxide (e.g. amorphous alumina, alumina sol, etc.), aluminosilicates (e.g. zeolite, kaolinite, etc.), oxides and hydroxides of alkaline earth metals (e.g. magnesium oxide, calcium oxide, strontium oxide, barium oxide, magnesium hydroxide, calcium hydroxide, strontium hydroxide, barium hydroxide, etc.), calcium phosphate, molecular sieves or activated carbon, hydroxides or amorphous oxides of various metals (e.g. Ti, Zr, Hf, V, Nb, Ta, Cr, Mo, W, Mn, Tc, Re, Fe, Co, Ni, Ru, Rh, Pd, Os, Ir, Pt, Cu, Ag, Au, Zn, Cd, Ga, In, Tl, Ge, Sn, Pb, Bi, La, Ce, etc.), and so on. These inorganic compounds may be used independently or in admixture of two or more of them.

To form a coating film from the photocatalytic coating composition of the present invention, the coating composition is coated on a substrate (e.g. glass, plastics, metals, ceramics, concrete, etc.), for example, by spin coating, dip coating, spray coating, brush coating, etc. or using a doctor blade, and the coated composition is dried by evaporating the solvent off at a temperature of room temperature to 100° C. and then preferably baked at a temperature of about 150° C. to 800° C.

The coating film formed from the coating composition of the present invention is transparent and has a haze of 10% or less, preferably 5% or less, more preferably 2% or less in view of the fanciness of the coating film.

Hereinafter, the present invention will be illustrated by Examples, which do not limit the scope of the present invention in any way.

In Examples, the properties of photocatalyts, coating compositions and coating films were measured or evaluated by the follow methods.

An average particle size (nm) is measured by measuring a particle size distribution of a sample using a submicron particle size analyzer ("N4 Plus" available from Coulter) and calculating a cumulative 50 wt. % diameter as an average particle size.

The size of crystallites is measured by measuring a X-ray diffraction pattern of a sample using a X-ray diffractometer ("RAD-IIA" available from RIGAKU DENKI Co., Ltd.) under prescribed conditions (X-ray tube: Cu, tube voltage: 40 kV, tube current: 35 mA, diffusing slit: 1 degree, scattering slit: 1 degree, sensor slit: 0.30 mm, sampling pitch: 0.020 degree, scanning rate: 2.00 degree/min., measurement integration: 1 time), obtaining a half-value width β (radian) and a peak position 2θ (radian) of the peak of the most intensive interference line of titanium oxide (plane indices: 101), and then calculating the size of a crystallite E1 according to the Scherrer equation:

$$E1(nm) = K \cdot \lambda / (\beta \cos\theta) \qquad (V)$$

in which K is a constant (0.94), λ (nm) is a wavelength of X-ray used in the measurement (Cu-Kα line: 0.154056 nm).

The adhering property of a coating film to a substrate is evaluated by adhering a mending tape from one end of the surface of the coating film to the other and quickly peeling off the mending tape from the surface to see if the coating film is peeled off at the same time.

The hardness of a coating film is evaluated with a pencil-hardness tester (available from TOYO SEIKI Co., Ltd.) under a load of 1 kg.

The haze of a coating film is measured with a haze-transmittance-reflectance meter (Reflectance and Transmittance Meter HR-1000 available from MURAKAMI COLOR RESEARCH LABORATORY).

EXAMPLE 1

In this Example, the following materials were used:
Titanium oxide photocatalyst responsive to visible light
Titanium oxysulfate (TM Crystals (trade name) available from TAYCA Corporation, appearance: white solid) (150 kg) was dissolved in ion-exchanged water (100 kg) to obtain an aqueous solution of titanium oxysulfate. To this aqueous solution (125 kg), 35 wt. % hydrogen peroxide solution (29.8 kg) was added over 140 minutes to obtain a purple-red solution.

Ion-exchanged water (30 liters) was charged in a reactor equipped with pH electrodes and a pH controller connected with the pH electrodes and comprising a mechanism for maintaining pH constant by supplying 25 wt. % aqueous ammonia (special grade, available from Wako Pure Chemical Industries, Ltd.). The pH controller was set to adjust pH at 4. With such a reactor, when pH of a liquid therein decreases to a value lower than a preset value, the supply of aqueous ammonia starts and aqueous ammonia is continuously supplied at a predetermined rate until pH reaches the preset value.

Then, the purple-red solution prepared in the previous step was added to the reactor at a rate of 500 ml/min. while stirring the content in the reactor at 60 rpm to allow the titanium oxysulfate to react with ammonia. The adding rate of aqueous ammonia was automatically controlled so that pH of the content in the reactor was maintained constant at 4. The reaction mixture was stirred for further 1 hour and then 25 wt. % aqueous ammonia (special grade, available from Wako Pure Chemical Industries, Ltd.) was added to the mixture at a rate of 500 ml/min. to obtain a slurry. The total content of aqueous ammonia supplied into the reactor was 89.8 kg, which was twice larger than an amount necessary for converting titanium oxysulfate to titanium hydroxide. The above chain of the steps were carried out while controlling the temperature at a constant temperature of 30° C. The slurry was filtrated, and the solid recovered was washed with ion-exchanged water to obtain a titanium oxide precursor. The titanium oxide precursor was baked in an air at 270° C. for 2 hours and then in an air at 300° C. for 4 hours, followed by cooling to room temperature to obtain titanium oxide powder. This titanium oxide powder had a crystallite particle size of 17.7 nm and a BET specific surface area of 71 $m^2/g$.

Preparation of photocatalyst dispersion

To ion-exchanged water (7,737 g), a 60% aqueous solution of nitric acid (special grade, available from Wako Pure Chemical Industries, Ltd.) (263 g) was added, and then the titanium oxide powder prepared in the above step (2,004 g) was added. The mixture was charged in a medium-agitation type disperser (DYNO-MILL KDL-PILOT A (trade name) available from Shinmaru Enterprises Corporation) and dispersed under the following conditions:

Medium: zirconia beads having a diameter of 0.3 mm (4.2 kg)

Agitation rate: peripheral velocity of 8 m/sec.

Flow rate: 1 liter/min.

Treatment time: 40 minutes.

The resulting slurry was transferred to another medium-agitation type disperser (ULTRA APEX MILL UAM-5 1001 (tradename) available from Kotobuki Engineering & Manufacturing Co., Ltd.) and further dispersed under the following conditions:

Medium: zirconia beads having a diameter of 0.05 mm (13 kg)

Agitation rate: peripheral velocity of 12.6 m/sec.

Flow rate: 2 liter/min.

Treatment time: 2.5 hours

The average particle size of titanium oxide was 58.5 nm, and the concentration of the dispersion was 14.7% by weight. This dispersion (hereinafter referred to as Titanium Oxide Dispersion A) was dried with an evaporator at 40° C. The crystal type of titanium oxide was an anatase type.

Preparation of binder

To ion-exchanged water (7.30 parts by weight) in a vessel, zirconium oxychloride octahydrate (special grade, available from KANTO KAGAKU Co., Ltd.) (14.17 parts by weight corresponding to 5.42 parts by weight of zirconium oxide) was added and stirred until the zirconium compound was completely dissolved. In a separate vessel, isopropanol (first grade, available from KANTO KAGAKU Co., Ltd.) (34.08 parts by weight) was charged, and the above solution of zirconium oxychloride was added to isopropanol and stirred for 20 minutes. Then, isopropanol (33.09 parts by weight) was added to the mixture and stirred for 20 minutes.

Thereafter, tetraethoxysilane (available from Tama Chemicals, Co., Ltd.) (8.05 parts by weight corresponding to 2.32 parts by weight of silicon oxide) was added to the above mixture and stirred for 20 minutes. Finally, colloidal silica (OSCAL-1432 (trade name) available from CATALYSTS & CHEMICALS IND. CO., LTD.; solid content: 30% by weight) (3.31 parts by weight corresponding to 0.99 part by weight of silicon oxide) was added and stirred for 30 minutes. The resultant liquid mixture was kept standing overnight and suction filtered through a 1 μm membrane filter made of polytetrafluoroethylene (PTFE) to obtain a binder for a photocatalytic coating composition (100 parts by weight). The binder contained 1.14 moles of Zr in zirconium oxychloride per 1 mole of Si in tetraethoxysilane. The total content of the zirconium compound, tetraethoxysilane and silica sol in the binder was 8.73 parts by weight in terms of oxides.

Preparation of photocatalytic coating composition

The concentration of Titanium Oxide Dispersion A was adjusted to 5% by weight by the addition of 2-propanol. To the diluted dispersion (4 g), the mixture of the binder (0.35 g) and 2-propanol (0.43 g) was added to obtain a photocatalytic coating composition. The amount of titanium oxide in the coating composition was 0.2 g, and the total content of the zirconium compound, tetraethoxysilane and silica sol was 0.031 g in terms of oxides. In other words, the components of the binder were added such that 15.5 parts by weight of the binder components in terms of oxides were mixed with 100 parts by weight of titanium oxide.

Formation of coating film of photocatalyst containing binders

The photocatalytic coating composition obtained in the above step was coated on a glass plate (80 mm×80 mm×3 mm thickness), which had been well degreased. Then, the glass plate was rotated with a spin coater (1H-D7 (trade name) available from MIKASA Co., Ltd.) at 2,000 rpm for 10 seconds to remove the excessive coating composition, and then the coated composition was dried at room temperature and then at 150° C. to form a film of the photocatalyst containing the binders over the whole area of one surface of the glass plate. Thereafter, the coating film was irradiated with UV ray for 3 days using four 20 W black-light lamps (UV ray intensity: 5.4 mW/cm$^2$) to decompose the organic components in the binder components. The adhesion property of the coating film was evaluated, but the coating film was not peeled. The coating film had a pencil hardness of 3H to 4H, and a haze of 1.9%.

Evaluation of catalytic activity of titanium oxide

The above glass plate coated with the coating film of the photocatalyst containing the binders was placed in a sealable glass reactor having a diameter of 13 cm, a height of 4.5 cm and a capacity of about 0.6 liter. The reactor was filled with a mixed gas of oxygen and nitrogen in a volume ratio of 1:4, and acetaldehyde was charged in the reactor so that the concentration of acetaldehyde was 100 ppm.

Then, the reactor was externally irradiated with visible light using a 27 W fluorescent lamp. In this case, an illumination intensity was 10,000 lux. The change of the concentration of acetaldehyde caused by the photocatalytic reaction under the irradiation with the fluorescent lamp was monitored with time using a photo acoustic multi-gas monitor (Type 1314 available from INNOVA). The reaction within 1 hour from the start of the light irradiation was found to be a first-order reaction in relation to the concentration of acetaldehyde, and the reaction rate constant was 0.0016 min$^{-1}$.

EXAMPLE 2

Preparation of binder

Ion-exchanged water (6.62 parts by weight) was charged in a vessel, and zirconium oxychloride octahydrate (special grade, available from KANTO KAGAKU Co., Ltd.) (12.85 parts by weight corresponding to 4.91 parts by weight of zirconium oxide) was added and stirred until the zirconium compound was completely dissolved. In a separate vessel, isopropanol (first grade, available from KANTO KAGAKU Co., Ltd.) (30.9 parts by weight) was charged, and then acetylacetone (available from DAICEL Chemical Industries, Ltd.) (9.33 parts by weight) was added and stirred for 10 minutes. To this mixture, the above solution of zirconium oxychloride was added and stirred for 20 minutes. Then, isopropanol (30 parts by weight) was added to the mixture and stirred for 20 minutes.

Thereafter, tetraethoxysilane (available from Tama Chemicals, Co., Ltd.) (7.3 parts by weight corresponding to 2.11 parts by weight of silicon oxide) was added to the above mixture and stirred for 20 minutes. Finally, colloidal silica (OSCAL-1432 (trade name) available from CATALYSTS & CHEMICALS IND. CO., LTD.) (3 parts by weight corresponding to 0.90 part by weight of silicon oxide) was added and stirred for 30 minutes. The resultant liquid mixture was kept standing overnight and suction filtered through a 1 μm membrane filter made of PTFE to obtain a binder for a photocatalytic coating composition (100 parts by weight). The binder contained 1.14 moles of Zr in zirconium oxychloride per 1 mole of Si in tetraethoxysilane, and 2.33 moles of acetylacetone per 1 mole of Zr in zirconium oxychloride. The total content of the zirconium compound, tetraethoxysilane and silica sol in the binder was 7.92 parts by weight in terms of oxides.

Preparation of photocatalytic coating composition

The concentration of Titanium Oxide Dispersion A prepared in the same manner as in Example 1 was adjusted to 5% by weight by the addition of 2-propanol. To the diluted dispersion (4 g), the mixture of the binder (0.39 g) and 2-propanol (0.39 g) was added to obtain a photocatalytic coating composition. The amount of titanium oxide in the coating composition was 0.2 g, and the total content of the zirconium compound, tetraethoxysilane and silica sol was 0.031 g in terms of oxides. In other words, the components of the binder were added such that 15.5 parts by weight of the binder components in terms of oxides were mixed with 100 parts by weight of titanium oxide.

Formation of coating film of photocatalyst containing binders

A coating film of a photocatalyst containing a binder was formed in the same manner as in Example 1 except that the photocatalytic coating composition prepared in the previous step was used. The adhesion property of the coating film was evaluated, but the coating film was not peeled. The coating film had a pencil hardness of 5H, and a haze of 1.2%.

The photocatalytic activity of this coating film of the photocatalyst was measured in the same manner as in Example 1. The reaction rate constant was 0.0015 min$^{-1}$. Furthermore, the photocatalytic activity of this coating film of the photocatalyst was measured in the same manner as in Example 1 except that a UV-absorbing film (ACHILLES VNILAS (trade name) available from Achilles Corporation) and a transparent acrylic plate (SUMIPEX (trade name) available from Sumitomo Chemical Co., Ltd.) were placed between the light source and the reactor to cut UV-ray so that the coating film was irradiated with the visible light only. The reaction rate constant was 0.00054 min$^{-1}$.

EXAMPLE 3

Preparation of binder

Ion-exchanged water (6.0 parts by weight) was charged in a vessel, and zirconium oxychloride octahydrate (special grade, available from KANTO KAGAKU Co., Ltd.) (10.0 parts by weight corresponding to 3.82 parts by weight of zirconium oxide) was added and stirred until the zirconium compound was completely dissolved. In a separate vessel, isopropanol (first grade, available from KANTO KAGAKU Co., Ltd.) (30.0 parts by weight) was charged, and then acetylacetone (available from DAICEL Chemical Industries, Ltd.) (9.0 parts by weight) was added and stirred for 10 minutes. To this mixture, the above solution of zirconium oxychloride was added and stirred for 20 minutes. Then, isopropanol (29 parts by weight) was added to the mixture and stirred for 20 minutes.

Thereafter, tetraethoxysilane (available from Tama Chemicals, Co., Ltd.) (13.0 parts by weight corresponding to 3.75 parts by weight of silicon oxide) was added to the above mixture and stirred for 20 minutes. Finally, colloidal silica (OSCAL-1432 (trade name) available from CATALYSTS & CHEMICALS IND. CO., LTD.) (3 parts by weight corresponding to 0.90 part by weight of silicon oxide) was added and stirred for 30 minutes. The resultant liquid mixture was kept standing overnight and suction filtered through a 1 μm membrane filter made of PTFE to obtain a binder for a photocatalytic coating composition (100 parts by weight). The binder contained 0.50 mole of Zr in zirconium oxychloride per 1 mole of Si in tetraethoxysilane, and 2.89 moles of acetylacetone per 1 mole of Zr in zirconium oxychloride. The total content of the zirconium compound, tetraethoxysilane and silica sol in the binder was 8.47 parts by weight in terms of oxides.

Preparation of photocatalytic coating composition

The concentration of Titanium Oxide Dispersion A prepared in the same manner as in Example 1 was adjusted to 5% by weight by the addition of 2-propanol. To the diluted dispersion (4 g), the mixture of the binder (0.24 g) and 2-propanol (0.24 g) was added to obtain a photocatalytic coating composition. The amount of titanium oxide in the coating composition was 0.2 g, and the total content of the zirconium compound, tetraethoxysilane and silica sol was 0.020 g in terms of oxides. In other words, the components of the binder were added such that 10.2 parts by weight of the binder components in terms of oxides were mixed with 100 parts by weight of titanium oxide.

Formation of coating film of photocatalyst containing binders

A coating film of a photocatalyst containing a binder was formed in the same manner as in Example 1 except that the photocatalytic coating composition prepared in the previous step was used. The adhesion property of the coating film was evaluated, but the coating film was not peeled. The coating film had a pencil hardness of 5H, and a haze of 1.2%.

The photocatalytic activity of this coating film of the photocatalyst was measured in the same manner as in Example 1. The reaction rate constant was 0.0014 $min^{-1}$.

EXAMPLE 4

Titanium oxide photocatalyst responsible to visible light

Titanium oxysulfate (TM Crystals (trade name) available from TAYCA Corporation, appearance: white solid) (150 kg) was dissolved in ion-exchanged water (100 kg) to obtain an aqueous solution of titanium oxysulfate. To this aqueous solution (125 kg), 35 wt. % hydrogen peroxide solution (29.8 kg) was added over 140 minutes to obtain a purple-red solution.

Ion-exchanged water (30 liters) was charged in a reactor equipped with pH electrodes and a pH controller connected to the pH electrodes and comprising a mechanism for maintaining pH constant by supplying 25 wt. % aqueous ammonia (special grade, available from Wako Pure Chemical Industries, Ltd.). The pH controller was set to adjust pH at 4. With such a reactor, when pH of a liquid therein decreases to a value lower than a preset value, the supply of aqueous ammonia starts and aqueous ammonia is continuously supplied at a predetermined rate until pH reaches the preset value.

Then, the purple-red solution prepared in the previous step was added to the reactor at a rate of 500 ml/min. while stirring the content in the reactor at 60 rpm to allow the titanium oxysulfate to react with ammonia. The adding rate of aqueous ammonia was automatically controlled so that pH of the content in the reactor was maintained constant at 4. The reaction mixture was stirred for further 1 hour and then 25 wt. % aqueous ammonia (special grade, available from Wako Pure Chemical Industries, Ltd.) was added to the mixture at a rate of 720 ml/min. to obtain a slurry. The total content of aqueous ammonia supplied into the reactor was 90 kg, which was twice larger than an amount necessary for converting titanium oxysulfate to titanium hydroxide. The above chain of the steps were carried out while controlling the temperature at a constant temperature of 30° C. The slurry was filtrated, and the solid recovered was washed with ion-exchanged water to obtain a titanium oxide precursor. The titanium oxide precursor was baked in an air at 300° C. for 6 hours and then in an air at 350° C. for 2 hours, followed by cooling to room temperature to obtain titanium oxide powder. This titanium oxide powder had a crystallite particle size of 16.1 nm and a BET specific surface area of 78.5 $m^2/g$.

Preparation of photocatalyst dispersion

To ion-exchanged water (7,905 g), oxalic acid dihydrate (special grade, available from Wako Pure Chemical Industries, Ltd.) (95 g) was added, and then the titanium oxide powder prepared in the previous step (2,000 g) was added. The mixture was charged in a medium-agitation type disperser (DYNO-MILL KDL-PILOT A (trade name) available from Shinmaru Enterprises Corporation) and dispersed under the following conditions:

Medium: zirconia beads having a diameter of 0.3 mm (4.2 kg)

Agitation rate: peripheral velocity of 8 m/sec.

Flow rate: 1 liter/min.

Treatment time: 16 minutes.

The resulting slurry was transferred to another medium-agitation type disperser (ULTRA APEX MILL UAM-5 1001 (trade name) available from Kotobuki Engineering & Manufacturing Co., Ltd.) and further dispersed under the following conditions:

Medium: zirconia beads having a diameter of 0.05 mm (13 kg)

Agitation rate: peripheral velocity of 12.6 m/sec.

Flow rate: 1 liter/min.

Treatment time: 40 minutes

The average particle size of titanium oxide was 60.3 nm, and the concentration of the dispersion was 14.4% by weight. This dispersion (hereinafter referred to as Titanium Oxide Dispersion B) was dried with an evaporator at 40° C., and the crystal type of titanium oxide was an anatase type.

Preparation of photocatalytic coating composition

The concentration of Titanium Oxide Dispersion B prepared in the same manner as in Example 4 was adjusted to 5% by weight by the addition of ethanol (special grade, available from Wako Pure Chemical Industries, Ltd.). To the diluted dispersion (2.0 g), the binder prepared in the same manner as in Example 2 (0.223 g) was added to obtain a photocatalytic coating composition. The colloidal silica contained in the binder had a particle size of 12 nm. The amount of titanium oxide in the coating composition was 0.2 g, and the total content of the zirconium compound, tetraethoxysilane and silica sol was 0.0177 g in terms of oxides. In other words, the components of the binder were added such that 17.7 parts by weight of the binder components in terms of oxides were mixed with 100 parts by weight of titanium oxide.

Formation of coating film of photocatalyst containing binders

A coating film of a photocatalyst containing a binder was formed in the same manner as in Example 1 except that the photocatalytic coating composition prepared in the previous step was used. The adhesion property of the coating film was evaluated, but the coating film was not peeled. The coating film had a pencil hardness of 5H, and a haze of 0.024%.

The photocatalytic activity of this coating film of the photocatalyst was measured in the same manner as in Example 1. The reaction rate constant was 0.0024 $min^{-1}$. Furthermore, the photocatalytic activity of this coating film of the photocatalyst was measured by irradiating the visible light only in the same manner as in Example 2. The reaction rate constant was 0.00051 $min^{-1}$.

EXAMPLE 5

Preparation of binder

Ion-exchanged water (7 parts by weight) was charged in a vessel, and zirconium oxychloride octahydrate (special grade, available from KANTO KAGAKU Co., Ltd.) (13 parts by weight corresponding to 4.97 parts by weight of zirconium oxide) was added and stirred until the zirconium compound was completely dissolved. In a separate vessel, ethanol (first grade, available from KANTO KAGAKU Co., Ltd.) (40 parts by weight) was charged, and then acetylacetone (available from DAICEL Chemical Industries, Ltd.) (10 parts by weight) was added and stirred for 10 minutes. To this mixture, the above solution of zirconium oxychloride was added and stirred for 20 minutes. Then, 2-ethoxyethanol (first grade, available from KANTO KAGAKU Co., Ltd.) (20 parts by weight) was added to the mixture and stirred for 20 minutes.

Thereafter, tetraethoxysilane (HIGH PURITY ETHYL ORTHOSILICATE (trade name) available from Tama Chemicals, Co., Ltd.) (7 parts by weight corresponding to 2.02 parts by weight of silicon oxide) was added to the above mixture and stirred for 20 minutes. Finally, colloidal silica (OSCAL-1432 (trade name) available from CATALYSTS & CHEMICALS IND. CO., LTD., particle size of 12 nm) (3 parts by weight corresponding to 0.90 part by weight of silicon oxide) was added and stirred for 30 minutes. The resultant liquid mixture was kept standing overnight and suction filtered through a 1 μm membrane filter made of PTFE to obtain a binder for a photocatalytic coating composition (100 parts by weight). The binder contained 1.20 moles of Zr in zirconium oxychloride per 1 mole of Si in tetraethoxysilane, and 2.47 moles of acetylacetone per 1 mole of Zr in zirconium oxychloride. The total content of the zirconium compound, tetraethoxysilane and silica sol in the binder was 7.89 parts by weight in terms of oxides.

Preparation of photocatalytic coating composition

The concentration of Titanium Oxide Dispersion B prepared in the same manner as in Example 4 was adjusted to 5% by weight by the addition of ethanol (special grade, available from Wako Pure Chemical Industries, Ltd.). To the diluted dispersion (6.0 g), the binder prepared in the same manner as in Example 2 (0.57 g) was added to obtain a photocatalytic coating composition. The amount of titanium oxide in the coating composition was 0.3 g, and the total content of the zirconium compound, tetraethoxysilane and silica sol was 0.045 g in terms of oxides. In other words, the components of the binder were added such that 15.0 parts by weight of the binder components in terms of oxides were mixed with 100 parts by weight of titanium oxide.

Formation of coating film of photocatalyst containing binders

A coating film of a photocatalyst containing a binder was formed in the same manner as in Example 1 except that the photocatalytic coating composition prepared in the previous step was used. The adhesion property of the coating film was evaluated, but the coating film was not peeled. The coating film had a pencil hardness of 5H, and a haze of 0.7%.

The photocatalytic activity of this coating film of the photocatalyst was measured in the same manner as in Example 1. The reaction rate constant was 0.0026 $min^{-1}$. Furthermore, the photocatalytic activity of this coating film of the photocatalyst was measured by irradiating the visible light only in the same manner as in Example 2. The reaction rate constant was 0.00051 $min^{-1}$.

EXAMPLE 6

Preparation of binder

Ethanol (first grade, available from Wako Pure Chemical Industries, Ltd.) (50.1 parts by weight) was charged in a vessel, and citric anhydride (special grade, available from Wako Pure Chemical Industries, Ltd.) (14.8 parts by weight). To the solution, zirconium n-butoxide (available from Johnson Matthey, concentration of 80% by weight) (18.5 parts by weight) was added and completely dissolved, and then tetraethyl orthosilicate (special grade tetraethoxysilane available from Wako Pure Chemical Industries, Ltd.) (7.1 parts by weight) was added and completely dissolved. After that, ion-exchanged water (6.5 parts by weight) was added to the solution. Furthermore, colloidal silica (SILICA SOL IPA-ST (trade name) available from Nissan Chemical Industries, Ltd., particle size of 10 to 15 nm) (3.0 parts by weight) was added to obtain a binder for a photocatalytic coating composition. The binder contained 1.13 moles of Zr in zirconium n-butoxide per 1 mole of Si in tetraethoxysilane, and 2 moles of citric acid per 1 mole of Zr in zirconium n-butoxide. The total content of the zirconium compound, tetraethoxysilane and silica sol in the binder was 7.70 parts by weight in terms of oxides.

Preparation of photocatalytic coating composition

The concentration of Titanium Oxide Dispersion B was adjusted to 5% by weight by the addition of ethanol (special grade, available from Wako Pure Chemical Industries, Ltd.). To the diluted dispersion (6.0 g), the binder prepared in the above step (0.97 g) was added to obtain a photocatalytic coating composition. The amount of titanium oxide in the coating composition was 0.3 g, and the total content of the zirconium compound, tetraethoxysilane and silica sol was 0.075 g in terms of oxides. In other words, the components of the binder were added such that 25.0 parts by weight of the binder components in terms of oxides were mixed with 100 parts by weight of titanium oxide.

Formation of coating film of photocatalyst containing binders

A coating film of a photocatalyst containing a binder was formed in the same manner as in Example 1 except that the photocatalytic coating composition prepared in the previous step was used. The adhesion property of the coating film was evaluated, but the coating film was not peeled. The coating film had a pencil hardness of 4H to 5H, and a haze of 0.9%.

The photocatalytic activity of this coating film of the photocatalyst was measured in the same manner as in Example 1. The reaction rate constant was 0.0022 $min^{-1}$.

COMPARATIVE EXAMPLE 1

Preparation of binder

Ion-exchanged water (2.27 parts by weight) was charged in a vessel, and zirconium oxychloride octahydrate (special grade, available from KANTO KAGAKU Co., Ltd.) (2.83 parts by weight corresponding to 1.08 parts by weight of zirconium oxide) was added and stirred until the zirconium compound was completely dissolved. In a separate vessel, isopropanol (first grade, available from KANTO KAGAKU Co., Ltd.) (33.54 parts by weight) was charged, and all of the above-prepared solution of zirconium oxychloride was added to isopropanol and stirred for 20 minutes. Then, isopropanol (50.0 parts by weight) was added to the mixture and stirred for 20 minutes.

Thereafter, tetraethoxysilane (available from Tama Chemicals, Co., Ltd.) (8.05 parts by weight corresponding to 2.32 parts by weight of silicon oxide) was added to the above mixture and stirred for 20 minutes. Finally, colloidal silica (trade name OSCAL-1432 available from CATALYSTS & CHEMICALS IND. CO., LTD.) (3.31 parts by weight corresponding to 0.99 part by weight of silicon oxide) was added and stirred for 30 minutes. The resultant liquid mixture was kept standing overnight and suction filtered through a 1 μm membrane filter made of PTFE to obtain a binder for a photocatalytic coating composition (100 parts by weight). The binder contained 0.23 mole of Zr in zirconium oxychloride per 1 mole of Si in tetraethoxysilane. The total content of the zirconium compound, tetraethoxysilane and silica sol in the binder was 4.39 parts by weight in terms of oxides.

Preparation of photocatalytic coating composition

The concentration of Titanium Oxide Dispersion A prepared in the same manner as in Example 1 was adjusted to 5% by weight by the addition of 2-propanol. To the diluted dispersion (4 g), the binder (0.72 g) was added to obtain a photocatalytic coating composition. The amount of titanium oxide in the coating composition was 0.2 g, and the total content of the zirconium compound, tetraethoxysilane and silica sol was 0.032 g in terms of oxides. In other words, the components of the binder were added such that 15.8 parts by weight of the binder components in terms of oxides were mixed with 100 parts by weight of titanium oxide.

Formation of coating film of photocatalyst containing binders

A coating film of a photocatalyst containing a binder was formed in the same manner as in Example 1 except that the photocatalytic coating composition prepared in the previous step was used. The adhesion property of the coating film was evaluated, but the coating film was peeled. The coating film had a pencil hardness of 2H to 3H, and a haze of 1.2%.

The photocatalytic activity of this coating film of the photocatalyst was measured in the same manner as in Example 1. The reaction rate constant was 0.0014 min$^{-1}$.

COMPARATIVE EXAMPLE 2

Preparation of binder

Ion-exchanged water (6.62 parts by weight) was charged in a vessel, and zirconium oxychloride octahydrate (special grade, available from KANTO KAGAKU Co., Ltd.) (12.85 parts by weight corresponding to 4.91 parts by weight of zirconium oxide) was added and stirred until the zirconium compound was completely dissolved. In a separate vessel, isopropanol (first grade, available from KANTO KAGAKU Co., Ltd.) (30.9 parts by weight) was charged, and then acetylacetone (available from DAICEL Chemical Industries, Ltd.) (9.33 parts by weight) was added while stirring and stirred for 10 minutes. To this solution of acetylacetone, all of the above-prepared solution of zirconium oxychloride was added and stirred for 20 minutes. Then, isopropanol (33 parts by weight) was added to the mixture and stirred for 20 minutes.

Thereafter, tetraethoxysilane (available from Tama Chemicals, Co., Ltd.) (7.3 parts by weight corresponding to 2.11 parts by weight of silicon oxide) was added to the above mixture and stirred for 20 minutes. The resultant liquid mixture was kept standing overnight and suction filtered through a 1 μm membrane filter made of PTFE to obtain a binder for a photocatalytic coating composition (100 parts by weight). The binder contained 1.14 mole of Zr in zirconium oxychloride per 1 mole of Si in tetraethoxysilane and 2.33 moles of acetylacetone per 1 mole of Zr in zirconium oxychloride. The total content of the zirconium compound and tetraethoxysilane in the binder was 7.02 parts by weight in terms of oxides.

Preparation of photocatalytic coating composition

The concentration of Titanium Oxide Dispersion B prepared in the same manner as in Example 4 was adjusted to 5% by weight by the addition of ethanol. To the diluted dispersion (6 g), the binder (0.64 g) was added to obtain a photocatalytic coating composition. The amount of titanium oxide in the coating composition was 0.3 g, and the total content of the zirconium compound and tetraethoxysilane was 0.045 g in terms of oxides. In other words, the components of the binder were added such that 15 parts by weight of the binder components in terms of oxides were mixed with 100 parts by weight of titanium oxide.

Formation of coating film of photocatalyst containing binders

A coating film of a photocatalyst containing a binder was formed in the same manner as in Example 1 except that the photocatalytic coating composition prepared in the previous step was used. The adhesion property of the coating film was evaluated, but the coating film was not peeled. The coating film had a pencil hardness of 3H to 4H, and a haze of 0.6%.

The photocatalytic activity of this coating film of the photocatalyst was measured in the same manner as in Example 1. The reaction rate constant was 0.00019 min$^{-1}$.

The binders prepared in Examples 1 to 5 and Comparative Examples 1 and 3 were stored at room temperature. The binders of Example 3 and Comparative Example 1 were gelled within 4 months, and the bonder of Example 1 started to gel and its viscosity increased, while other binders were not gelled at all.

What is claimed is:

1. A photocatalytic coating composition comprising a photocatalyst, a silicon alkoxide, a zirconium compound, colloidal silica, and a liquid medium, wherein the content of the zirconium compound in terms of zirconium atoms is 0.3 to 3 times by mole the content of the silicon alkoxide in terms of silicon atoms: and
   wherein said composition further comprises at least one chelating agent selected from the group consisting of β-diketones, dicarboxylic acids and tricarboxylic acids.

2. The photocatalytic coating composition according to claim 1, wherein the content of colloidal silica in terms of silicon oxide is 1to 200 parts by weight per 100parts by weight of the silicon alkoxide in terms of silicon oxide, and the total content of the silicon alkoxide, the zirconium compound and colloidal silica in terms of the oxides is 5to 200parts by weight of the photocatalyst.

3. The photocatalytic coating composition according to claim 1, wherein the amount of the chelating agent is 1to 40times by mole the content of the zirconium compound in terms of zirconium atoms.

4. The photocatalytic coating composition according to claim 1, which contains at least 0.1% by weight of the photocatalyst based on the whole weight of the coating composition.

5. The photocatalytic coating composition according to claim 1, wherein the photocatalyst comprises titanium oxide.

6. The photocatalytic coating composition according to claim 1, wherein the liquid medium comprises an organic solvent.

* * * * *